United States Patent
Klemm et al.

(10) Patent No.: US 7,180,254 B2
(45) Date of Patent: Feb. 20, 2007

(54) METHOD AND APPARATUS FOR CONTROLLING AN OSCILLATING ELECTRIC MOTOR OF A SMALL ELECTRIC APPLIANCE

(75) Inventors: Torsten Klemm, Bad Soden (DE); Bernhard Kraus, Braunfels (DE); Uwe Schaaf, Alsbach-Hahnlein (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 11/025,311

(22) Filed: Dec. 29, 2004

(65) Prior Publication Data

US 2005/0146296 A1    Jul. 7, 2005

Related U.S. Application Data

(63) Continuation of application No. PCT/EP2002/012884, filed on Nov. 18, 2002.

(30) Foreign Application Priority Data

Jun. 29, 2002    (DE) ................. 102 29 319

(51) Int. Cl.
    *H02P 1/00*    (2006.01)
(52) U.S. Cl. .................. 318/135; 318/37; 318/432; 318/434
(58) Field of Classification Search ........ 318/126–129, 318/432, 434, 37, 59, 66
    See application file for complete search history.

(56) References Cited

U.S. PATENT DOCUMENTS

| | | | |
|---|---|---|---|
| 3,676,758 A | 7/1972 | Mathews | 318/128 |
| 4,309,675 A | 1/1982 | Rabe | 331/172 |
| 4,504,775 A * | 3/1985 | Becker | 320/140 |
| 5,032,772 A | 7/1991 | Gully et al. | 318/135 |
| 5,632,087 A | 5/1997 | Motohashi et al. | 30/43.9 |
| 5,753,985 A * | 5/1998 | Redlich | 310/36 |
| 5,921,134 A * | 7/1999 | Shiba et al. | 74/110 |
| 6,357,659 B1 * | 3/2002 | Kelly et al. | 235/462.01 |
| 6,753,665 B2 * | 6/2004 | Ueda et al. | 318/135 |
| 6,832,898 B2 * | 12/2004 | Yoshida et al. | 417/44.11 |
| 7,005,810 B2 * | 2/2006 | Ueda et al. | 318/114 |

FOREIGN PATENT DOCUMENTS

| | | |
|---|---|---|
| DE | 100 36 260 | 2/2002 |
| EP | 0 952 663 | 10/1999 |
| EP | 0 977 344 | 2/2000 |
| EP | 1 063 760 | 12/2000 |
| EP | 1 117 176 | 7/2001 |

\* cited by examiner

*Primary Examiner*—Rina Duda
(74) *Attorney, Agent, or Firm*—Fish & Richardson P.C.

(57) ABSTRACT

A method of controlling an oscillating electric motor of a small electric appliance, the method including supplying an electric current to a coil to produce a magnetic field emanating from a first motor component and setting a second motor component in an oscillatory motion relative to the first motor component; determining at least one electrical characteristic of the coil for an instant of time at which current is supplied to the coil, the at least one electrical characteristic being related to a motion quantity of the first motor component relative to the second motor component; and then supplying further current to the coil as a function of the at least one electrical characteristic determined.

33 Claims, 2 Drawing Sheets

METHOD AND APPARATUS FOR CONTROLLING AN OSCILLATING ELECTRIC MOTOR OF A SMALL ELECTRIC APPLIANCE

CROSS REFERENCES TO RELATED APPLICATIONS

This is a continuation of PCT Application No. PCT/EP2002/012884, filed on Nov. 18, 2002, which claims priority to German Patent Application No. 102 29 319.8, filed on Jun. 28, 2002, each of which is incorporated herein by reference in its entirety.

TECHNICAL FIELD

This invention relates to a method and apparatus for controlling an oscillating electric motor of a small electric appliance.

BACKGROUND

Generally, an oscillating electric motor is constructed as a system capable of maintaining oscillations, to which energy is supplied by means of a coil operated as an electromagnet. In order to ensure that the proper amount of energy is supplied at the proper timing, it is helpful to detect the state of motion of the electric motor. In this regard, a variety of approaches have been described in the art.

U.S. Pat. No. 5,632,087 describes a dry shaver with a linear motor. The linear motor includes a stator winding and a reciprocator which is equipped with a permanent magnet and is set in a linear oscillation by the stator winding. The displacement of the reciprocator is sensed by means of a detector and, depending on the sensed displacement, the supply of current to the stator winding is controlled such that the oscillation amplitude of the reciprocator is maintained constant. The detector is comprised of a permanent magnet arranged on the reciprocator and a fixedly mounted sensor winding in which, through action of the permanent magnet, an induced voltage is generated. The induced voltage is dependent upon the speed of the reciprocator.

EP 1 063 760 A2 discloses a control system for a linear vibration motor in which a vibrator is set in a linear vibration with a constant vibration amplitude relative to a stator. The linear motor includes a winding arranged on either the stator or the vibrator. A permanent magnet is arranged on the respective other component (i.e., on the vibrator or on the stator). The magnetic field generated when current is transmitted through the winding acts on the permanent magnet, causing the vibrator to be set in a linear vibration. In this process, the current flow is controlled to produce a constant vibration amplitude. To determine the vibration amplitude, the current supply to the winding is interrupted and the voltage then developed across the winding is determined.

SUMMARY

The invention relates to a method of controlling an oscillating electric motor of a small electric appliance in. In one aspect of the invention, an electric current is supplied at least temporarily to a coil for the development of a magnetic field that, emanating from a first motor component, acts on a second motor component such as to set the second motor component in an oscillatory motion relative to the first motor component. For an instant of time at which current is supplied to the coil, at least one electrical characteristic of the coil is determined, which is related to a motion quantity of the first or the second motor component. The current can then be supplied to the coil as a function of the at least one electrical characteristic determined.

In some embodiments, the method has the advantage of providing precise control of the electric motor without an additional sensor for detecting the state of motion of the electric motor, because the coil can be simultaneously used as a sensor. In this method, it is particularly advantageous that the operation of the electric motor is not subject to restrictions in spite of the coil's dual function, because current supply to the coil is not interrupted for the detection of the state of motion of the electric motor. This means that a reduction of the maximum power and the efficiency of the electric motor, which accompanies such an interruption of the current supply, can be avoided. Another advantage is that the methods described herein are suitable for many types of use. For example, some of the methods can be used with electric motors in which the waveform of the voltage induced in the coil varies strongly in dependence upon the oscillation amplitude.

The second motor component generates or acts upon a magnetic field, thereby inducing a voltage in the coil. In this way, a correlation is established between a motion quantity of the first motor component relative to the second motor component and at least one electrical characteristic of the coil.

As an electrical characteristic, the voltage developed across the coil can be determined. Furthermore, the current flowing through the coil can be determined as an electrical characteristic. In particular at least one measured value for the current transmitted through the coil prior to an instant of time for which the current is to be determined and at least one measured value subsequent to this instant of time can be detected, and a mean value of the detected measured values can be calculated. The variation of the current flowing through the coil with time can also be determined as an electrical characteristic. In order to determine the variation of the current with time at a predeterminable instant of time, measured values for the current prior to and subsequent to this instant of time can be detected, and the difference of the measured values can be divided by the time difference between the detections. It is an advantage in this method that the aforementioned electrical characteristics can be determined with relatively little effort.

In some embodiments, at least one electrical characteristic is determined at an instant of time when the relative velocity between the two motor components amounts to its maximum value. This has the advantage of enabling the correlation between the at least one electrical characteristic and the motion quantity of the first relative to the second motor component to be represented in particular simple manner. The instant of time for the maximum value of the relative velocity between the two motor components can be determined from the instants of time when this velocity equals zero. Furthermore, an oscillation frequency of the motor components can be determined from the instants of time when the relative velocity between these equals zero. In some embodiments, the zero crossings of the voltage developed across the coil correspond to the instants of time when the relative velocity between the two motor components is equal to zero. This has the advantage of enabling the zero crossings to be measured in a relatively simple manner.

In certain embodiments the instant of time for the maximum velocity value is determined by obtaining the time difference between the last and the second to the last crossing and by adding half of the time difference to the time of the last zero crossing. It is an advantage that the zero crossings can also be used for determining the oscillation frequency of the second motor component.

For determining a zero crossing, the operational sign of the voltage developed overall across the coil can be sensed repeatedly and the zero crossing can then be detected on a change of the operational sign between successive detections. For improved accuracy, the time of the zero crossing can be determined by interpolation between the last detection preceding the sign change and the first detection following the sign change.

In some embodiments, the electrical characteristics are determined for the same instant of time, because the electrical characteristics are each time-dependent and can influence each other.

A parameter for characterizing the oscillatory motion of the electric motor can be determined from the at least one electrical characteristic. For example, the relative velocity between the two motor components can be determined. Furthermore, an oscillation amplitude of the motor components can be determined. In certain embodiments, the current supplied to the coil is varied in dependence upon a deviation of the determined parameter for characterizing the oscillatory motion from a desired value. This enables relatively simple and reliable control of the current supply to the coil.

A current that is pulse-duration-modulated dependent on the at least one electrical characteristic can be supplied to the coil. Furthermore, a current of a strength dependent on the at least one electrical characteristic can be supplied to the coil.

The methods and apparatus described herein advantageously enable improved control of oscillating electric motors of small electric appliances, such as electric shavers and electric toothbrushes.

Other features and advantages of the invention will be apparent from the description, the drawings, and the claims.

DESCRIPTION OF DRAWINGS

Like reference symbols in the various drawings indicate like elements.

DETAILED DESCRIPTION

Figure 1:
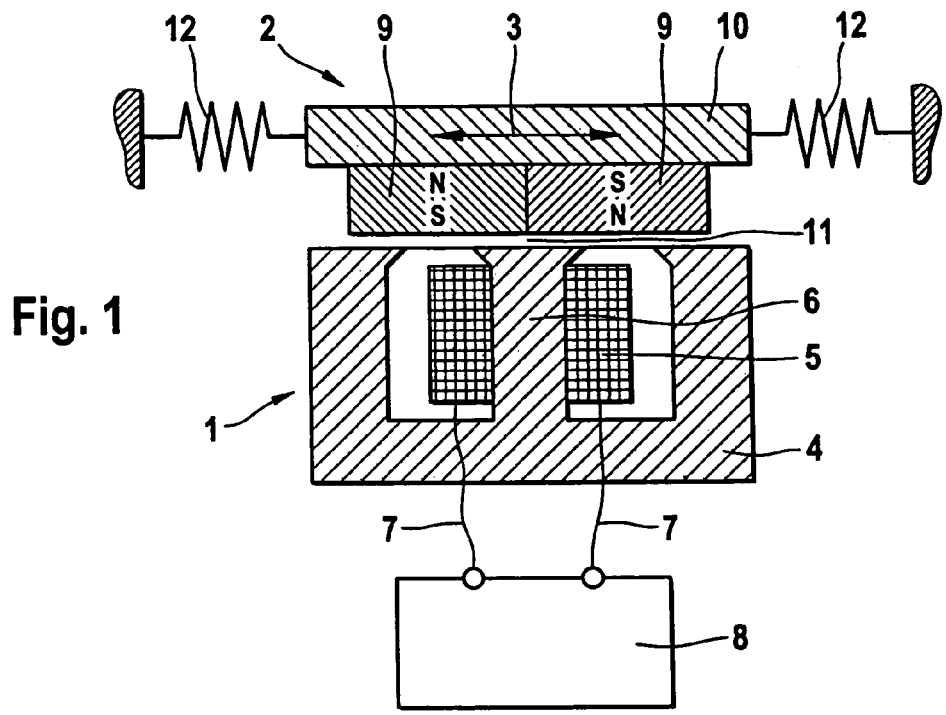
FIG. 1 is a schematic view of an embodiment of a linear oscillating motor.

FIG. 1 shows schematically an embodiment of a linear oscillating motor. The linear motor has a stationary stator 1 and a movable element 2 that is capable of executing a linear motion in the directions indicated by a double arrow 3. Alternatively, it is possible for the stator 1 to be constructed in accordance with the movable element 2 as regards its degrees of freedom of motion, that is, the stator 1 may be replaced by a component corresponding to the movable element 2 in terms of its movability, but otherwise including the functional features of the stator 1. However, for the sake of simplicity, the stator 1 will be described herein as a stationary stator. The stator 1 includes an iron core 4 shaped in the form of an "E" and a wire-wound coil 5. The coil 5 is wound around a center beam 6 of the iron core 4 and electrically connected to a controller 8 by means of connecting leads 7. The movable element 2 has two permanent magnets 9, each resting with one of its poles against a carrier plate 10 and being arranged closely side by side with opposite polarity. The permanent magnets 9 are separated by an air gap 11 at the forward end of the center beam 6 of the iron core 4.

Like the iron core 4, the carrier plate 10 is made from an iron material and has each of its two opposite ends connected to an end of a respective helical spring 12. The helical springs 12 have their other ends fixedly suspended so that the movable element 2 is able to execute linear oscillating motions in the directions indicated by the double arrow 3. The fixed ends of the helical springs 12, for example, can be fixedly suspended to a housing of a small electric appliance to which the linear motor is mounted.

With the linear motor in operating condition, suitable control by means of the controller 8 produces a current flow through the coil 5, causing a magnetic field to build up in the iron core 4. Particularly in the region of the forward end of the center beam 6 of the iron core 4, the magnetic field acts on the permanent magnets 9, causing a lateral displacement of the movable element 2 relative to the stator 1. The direction of the displacement depends on the direction of the current in the coil 5. By varying the current flow through the coil 5, which involves a change in the current direction, and through support by the helical springs 12, the movable element 2 can be set in a linear oscillating motion. Some motion quantities of this oscillating motion are shown in FIG. 2 and discussed below.

Figure 2:
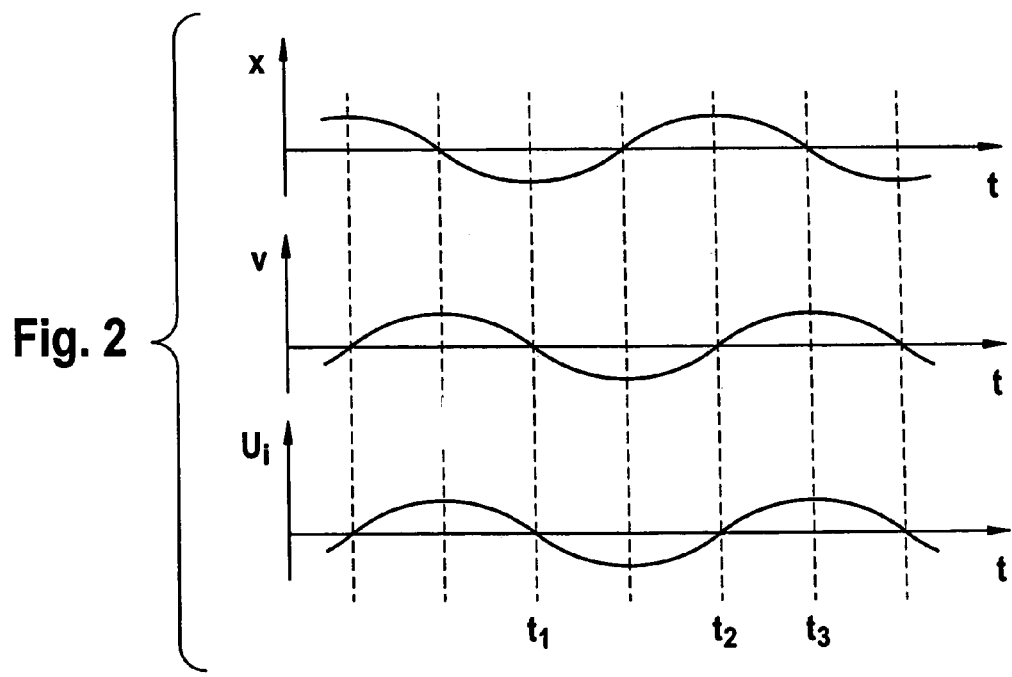
FIG. 2 shows graphical representations of the displacement of a movable element from its position of equilibrium (upper graph), the velocity of the movable element (middle graph) and a voltage induced by permanent magnets in a coil of a stator (lower graph), each plotted as a function of time.

FIG. 2 shows graphical representations of a displacement x of the movable element 2 from its position of equilibrium (upper graph), a velocity v of the movable element 2 (middle graph), and a voltage induced by the permanent magnets 9 in the coil 5 (lower graph), each plotted as a function of time. In all diagrams, the time t is plotted on the abscissa. In the upper graph, the displacement x of the movable element 2 (e.g., the displacement of the center of gravity of the movable element 2) is plotted. In the middle graph, the velocity v of the movable element 2 is plotted. In the lower graph, the voltage $U_i$ induced in the coil 5 is plotted.

The movable element 2 performs a linear harmonic oscillation so that the displacement x of the movable element 2 out of its position of equilibrium as a function of time may be represented by a cosine function which is expressed as $$x = A \cos(\omega t - \phi)$$

where A denotes the maximum amount of displacement of the movable element 2 from its position of equilibrium (i.e., the oscillation amplitude), $\omega$ denotes the angular frequency, and $\phi$ denotes the phase.

The velocity v of the movable element 2 as a function of time is to be represented correspondingly by a sine function which is expressed as $$v = A\omega \sin(\omega t - \phi)$$

Accordingly, the displacement x and the velocity v of the movable element 2 over time are in phase quadrature.

Control of the coil 5 by the controller 8 can be timed with the state of motion of the movable element 2 in order to achieve the desired effect with the generated current flow through the coil 5. Furthermore, the energy supplied to the movable element 2 via the magnetic field of the coil 5 can be dependent upon the respective requirements. For example, the energy can be calculated such that the oscillation amplitude A is maintained as substantially constant, even in cases where the movable element 2 is exposed to a varying load. The varying load, for example, can be balanced by a corresponding variation of the current flow through the coil 5. The oscillation amplitude A can be regulated at a substantially constant value, for example, by determining the oscillation amplitude A or a related quantity. For determining the oscillation amplitude A, it is possible to use the voltage $U_i$ induced in the coil 5 by the moved permanent magnets 9. Considering that the permanent magnets 9 are parts of the movable element 2, the induced voltage $U_i$ depends on the state of motion of the movable element 2. The relationship between the induced voltage $U_i$ and the velocity v of the movable element 2 is expressed as:

$$U_i = M_K v$$

The induced voltage $U_i$ is thus directly proportional to the velocity v of the movable element 2 with a proportionality constant $M_K$, which is dependent upon the construction of the linear motor. As shown in FIG. 2, the induced voltage waveform $U_i$ over time is represented by a cosine function that has the same periodicity as the cosine function for the velocity waveform v of the movable element 2 over time and is in phase therewith.

To determine, on the basis of the velocity v of the movable element 2, the oscillation amplitude A of the movable element 2 with minimal computation effort, the following procedure can be applied:

The oscillation frequency f or, alternatively, the angular frequency ω of the movable element 2 can be determined from the zero crossings of the velocity v (e.g., the points at which the velocity of the moveable element is substantially equal to zero) and hence from the induced voltage $U_i$ at the times $t_1$, and $t_2$ succeeding each other at the interval of half the oscillation period of the movable element 2:

$$f = \omega/(2\pi) = 1/(2(t_2 - t_1))$$

At a time $t_3$, which is halfway between successive zero crossings, the velocity v amounts to its maximum value Aω, so that the following equation holds true:

$$A = v_3/\omega$$

with $$v_3 = v(t_3)$$

Time $t_3$ represents, after the zero crossing at time $t_2$, the first maximum amount of the velocity v or the induced voltage $U_i$ and is given by $$t_3 = t_2 + (t_2 - t_1)/2$$

Hence the oscillation amplitude can be determined by detecting the zero crossings of the induced voltage $U_i$ and computing therefrom the next instant of time $t_3$ at which the velocity v of the movable element 2 amounts to its maximum value $v_3$. From the induced voltage $U_i$ detected at time $t_3$, the maximum velocity $v_3$ of the movable element 2 can be calculated by means of the proportionality constant $M_K$, and from this the oscillation amplitude A can be calculated. Current supply to the coil 5 can be controlled as a function of the deviation of the oscillation amplitude A from a targeted value.

However, when reducing the approach herein described to practice, it can be difficult to determine the voltage $U_i$ induced in the coil 5 by the permanent magnets 9 at time $t_3$ because, at time $t_3$, a current I flows through the coil 5 which produces across the coil 5 a voltage drop $U_R$ and a self-induced voltage $U_L$. $U_i$, therefore, cannot easily be determined by direct measurement. The methods described herein, however, help to address this issue.

Figure 3:
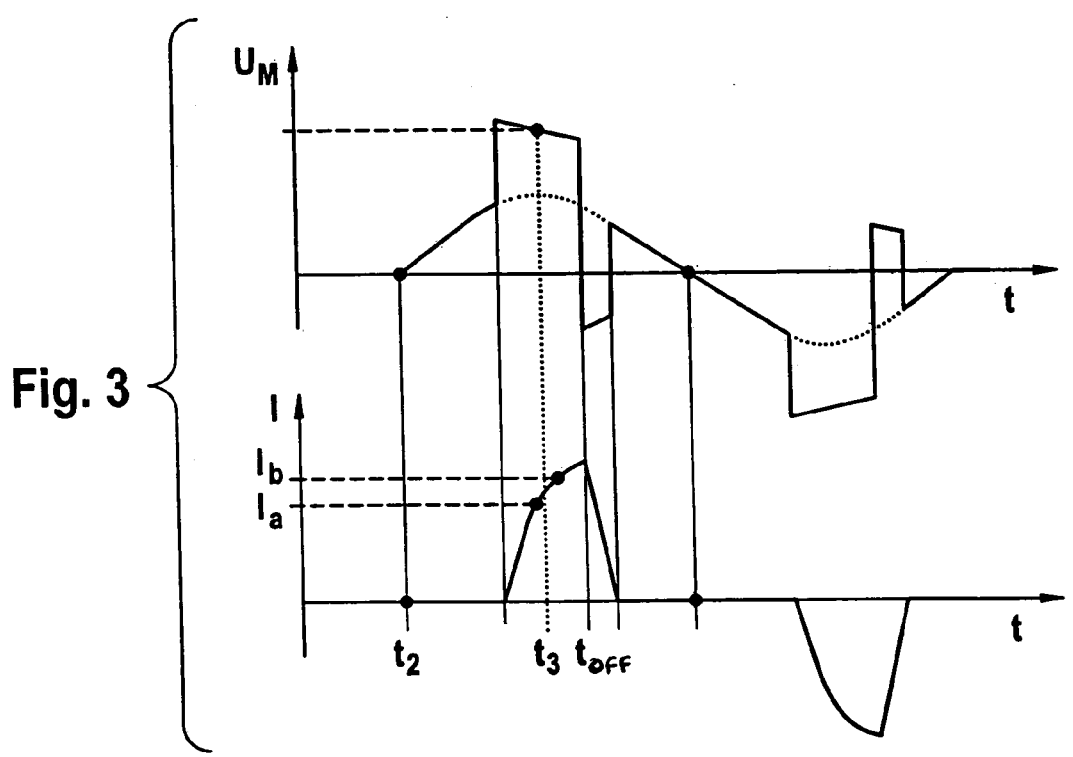
FIG. 3 shows graphical representations of the voltage developed across the coil 5 (upper graph) and of the current flowing through the coil (lower graph), each plotted as a function of time.

FIG. 3, for example, shows graphical representations of the voltage $U_M$ developed overall across the coil 5 (upper graph) and of the current I flowing through the coil 5 (lower graph), each plotted as a function of time. In both graphs the time t is plotted on the abscissa. Plotted on the ordinate in the upper graph is the voltage $U_M$ developed across the coil 5 and plotted in the lower graph is the current I flowing through the coil 5. Where the voltage $U_M$ developed across the coil 5 differs from the induced voltage $U_i$, the waveform of the induced voltage $U_i$ is shown in dotted lines.

As shown in the upper graph of FIG. 3, at time $t_3$, when the induced voltage $U_i$ is to be determined, a clear deviation exists between the voltage $U_M$ developed across the coil 5 (line drawn in full) and the induced voltage $U_i$ (dotted line). This deviation is due in part to the voltage drop $U_R$ caused by the current I flowing through the coil 5 across the ohmic resistance of the coil 5. Further deviation between the voltage $U_M$ developed across the coil 5 and the induced voltage $U_i$ can occur due to the self-induction of the coil 5, whereby each variation of the current flow through the coil 5 induces a counter voltage $U_L$ which counteracts the variation of the current flow. The influence of the counter voltage $U_L$ becomes particularly clear directly upon shutting off the supply of current to the coil 5 at time $t_{off}$. At time $t_{off}$ an abrupt drop in the voltage $U_M$ across the coil 5 can be recognized, which can even produce a reversal of the polarity of the voltage $U_M$.

Overall, therefore, the voltage $U_M$ developed across the coil 5 is composed of the voltage drop $U_R$ across the ohmic resistance of the coil 5, the self-induced voltage $U_L$, and the voltage $U_i$ induced by the permanent magnets 9, so that the following equation holds true:

$$U_M = U_R + U_L + U_i$$

The voltage drop $U_R$ across the ohmic resistance of the coil 5 is obtained by:

$$U_R = RI$$

where R is the ohmic resistance of the coil 5 and I is the current flowing through the coil 5.

On a variation of the current with time dI/dt, the self-induced voltage $U_L$ of the coil 5 with inductance L is given by:

$$U_L = L dI/dt$$

Considering the relationship for the voltage $U_i$ induced in the coil 5 by the magnets 9, the voltage $U_M$ developed across the coil 5 is given by:

$$U_M = RI + L dI/dt + v M_K$$

The velocity v of the movable element 2 can be obtained as follows:

$$v = (U_M - RI - L dI/dt)/M_K$$

If in addition use is made of the simplified computation of the oscillation amplitude A of the movable element 2 from the maximum amount of the velocity $v_3$ of the movable element 2, the approach described below can be used for controlling current transmitted to the coil 5.

The zero crossings of the voltage $U_i$ induced by the permanent magnets 9 in the coil 5 can be determined by repeated measurements of the voltage $U_M$ developed across the coil 5 and by interpolation on a sign change of the voltage $U_M$ between the times of the last measurement preceding and the first measurement following the sign change. Alternatively, measurements of the voltage $U_M$ developed across the coil 5 can be evaluated to determine the zero crossings of the voltage $U_i$ induced by the permanent magnets 9. For example, it can be concluded that a zero crossing has taken place when the voltage $U_M$ first decreases and then increases again in amount. Hence the zero crossings of the induced voltage $U_i$ are identical with the zero crossings of the motor voltage $U_M$ only when the current I equals zero (and dI/dt equals zero). If the current through the motor coil is unequal to zero at the measurement points, it is necessary to subtract R×I as well as L dI/dt from the measured motor voltage $U_M$ in order to determine the induced voltage $U_i$. From the determined times $t_1$ and $t_2$ for consecutive zero crossings, the time $t_3$ for the next maximum amount of the velocity $v_3$ of the movable element 2 can be determined, and the voltage $U_M$ developed across the coil 5 can be measured at time $t_3$. Furthermore, briefly before and briefly after time $t_3$ the currents $I_a$ and $I_b$ flowing through the coil 5 can be measured. The current I at time $t_3$ can be determined as an average value from the measured values $I_a$ and $I_b$:

$$I=(I_a+I_b)/2$$

The variation of the current with time dI/dt is given by:

$$dI/dt=(I_b-I_a)/\Delta t$$

where $\Delta t$ is the time elapsed between the two current measurements $I_a$ and $I_b$.

With the aid of the above-given formula $v=(U_M-RI-L\,dI/dt)\,M_K$, the velocity v of the movable element 2 is computed from the measured value for the voltage $U_M$ developed across the coil 5, the determined value for the current I flowing through the coil 5 and its variation with time dI/dt, and from the known values for the ohmic resistance R, the inductance L of the coil 5, and the proportionality constant $M_K$. Since the measured values were determined for time $t_3$, the velocity v calculated therefrom is representative of a maximum amount, thus enabling the oscillation amplitude A of the movable element 2 to be calculated therefrom by a division by the angular frequency $\omega$. The angular frequency $\omega$ was previously determined from the time interval between the successive zero crossings of the voltage $U_M$ developed across the coil 5. By comparing the oscillation amplitude A of the movable element 2 with the targeted value, it is possible to determine the current signal with which the coil 5 is to be controlled in order to obtain the targeted value for the oscillation amplitude A.

The current signal for controlling the coil 5 can be a clocked signal. For example, a pulse-duration-modulated signal can be utilized, whereby the pulse duration is increased when the oscillation amplitude A of the movable element 2 is too low, and the pulse duration is decreased when the oscillation amplitude A of the movable element 2 is too high. It is also possible to use a signal of constant pulse duration and to vary the pulse height (i.e., the current strength) or the edge steepness in dependence upon the oscillation amplitude A of the movable element 2. Combinations of the described approaches are also possible.

For enhanced accuracy of the methods described herein, further current measurements and/or further voltage measurements can be carried out and corresponding mean values can be determined. The mean values can reflect the respective relationships at time $t_3$.

Furthermore, it may be beneficial to take additional measures for a reliable detection of the zero crossings of the induced voltage $U_i$ because zero crossings caused by other circumstances, such as the self-induced voltage $U_L$, may occur in the voltage $U_M$ developed across the coil 5. To detect the desired zero crossings, a filter that suppresses regions in which the voltage $U_M$ developed across the coil 5 changes severely can be used. It is also possible to restrict the search for zero crossings to time ranges in which the desired zero crossings are to be expected.

In a simplified representation, the induced voltage is calculated in the microcontroller as follows:

$$U_i=U_M-R*I-L*dI/dt$$

The current I is determined from the voltage drop $U_S$ across the additionally connected resistor (shunt) $R_S$:

$$I=U_S/R_S$$

Using two measurements $U_{S1}$ and $U_{S2}$, $U_i$ is given by:

$$U_i=U_M-R*(U_{S1}+U_{S2})/2/R_S-L*(U_{S2}-U_{S1})/R_S/dt$$

This may be changed to read:

$$U_i=U_M-U_{S1}*(R/R_S/2-L/R_S/dt)-U_{S2}(R/R_S/2+L/R_S/dt)$$

The two constant expressions in parentheses can be calculated from the known values R, $R_S$, L and dt. This reduces the calculation of $U_i$ to:

$$U_i=U_M-c_1*U_{S1}-c_2*U_{S2}$$

where $c_1$ and $c_2$ are constants. Using the above equation, the induced voltage $U_i$ can be determined by performing only two subtraction steps and two multiplication steps. There is no need, for example, to carry out divisions or differentiations. Consequently, this calculation can be performed relatively easily and rapidly by a microcontroller.

Other embodiments are within the scope of the following claims.

What is claimed is:

1. A method of controlling an oscillating electric motor of a small electric appliance, the method comprising:
   supplying an electric current to a coil to produce a magnetic field emanating from a first motor component and setting a second motor component in an oscillatory motion relative to the first motor component;
   determining a measure of current flowing through the coil for an instant of time at which current is supplied to the coil by detecting at least one measured value for a first current transmitted through the coil prior to the instant of time, and detecting at least one measured value for a second current transmitted through the coil subsequent to the instant of time, and then calculating a mean value of the detected measured values of the first and second currents;
   based on the determined measure of current flowing through the coil, determining a motion quantity of the first motor component relative to the second motor component; and then
   supplying further current to the coil as a function of the determined measure of current flowing through the coil.

2. The method of claim 1, wherein the second motor component induces a voltage in the coil.

3. The method of claim 1, wherein the measure of current flowing through the coil is determined at an instant of time corresponding to a maximum relative velocity between the two motor components.

4. The method of claim 3, wherein the instant of time corresponding to the maximum relative velocity is determined as a function of at least two instants of time at which the relative velocity equals zero.

5. The method of claim 3, wherein the instant of time corresponding to the maximum value of the relative velocity is determined as a midpoint between adjacent instants of time at which a voltage across the coil equals zero.

6. The method of claim 1, wherein an oscillation frequency of the motor components is determined as a function of at least two instants of time at which a relative velocity between the two motor components equals zero.

7. The method of claim 6, wherein the instants of time at which the relative velocity equals zero correspond to instants of time at which the voltage across the coil equals zero.

8. The method of claim 7, wherein the instants of time at which the voltage across the coil equals zero is determined by repeatedly sensing an operational sign of the voltage across the coil and detecting a change of the operational sign between successive detections.

9. The method of claim 1, wherein a parameter for characterizing the oscillatory motion of the electric motor is determined from the measure of current flowing through the coil.

10. The method of claim 9, wherein a velocity of the second motor component is determined as a function of the measure of current flowing through the coil.

11. The method of claim 9, wherein an oscillation amplitude of the second motor component is determined as a function of the measure of current flowing through the coil.

12. The method of claim 9, wherein the current supplied to the coil is varied as a function of a difference between a target value and the determined parameter for characterizing the oscillatory motion.

13. The method of claim 1, wherein the current is supplied to the coil as a pulse-width-modulated voltage, and the pulse width is determined as a function of the measure of current flowing through the coil.

14. The method of claim 1, wherein a strength of the current supplied to the coil is a function of the measure of current flowing through the coil.

15. A method of controlling an oscillating electric motor of a small electric appliance, the method comprising:
supplying an electric current to a coil to produce a magnetic field emanating from a first motor component and setting a second motor component in an oscillatory motion relative to the first motor component;
determining at least one measure of current flowing through the coil for an instant of time at which current is supplied to the coil,
the measurement of current flowing through the coil being related to a motion quantity of the first motor component relative to the second motor component,
wherein determining the measure of current flowing through the coil comprises detecting at least one measured value for a first current transmitted through the coil prior to the instant of time, and detecting at least one measured value for a second current subsequent to the instant of time, and then calculating a mean value of the detected measured values of the first and second currents; and then
supplying further current to the coil as a function of the at least one measure of current flowing through the coil.

16. A method of controlling an oscillating electric motor of a small electric appliance, the method comprising:
supplying an electric current to a coil to produce a magnetic field emanating from a first motor component and setting a second motor component in an oscillatory motion relative to the first motor component;
determining at least one variation of current flowing through the coil over time, wherein determining the variation of the current over time comprises detecting measured values of current prior to and subsequent to an instant of time, and dividing a difference of the measured values by a time difference between current detections,
the variation of current flowing through the coil over time being related to a motion quantity of the first motor component relative to the second motor component; and then
supplying further current to the coil as a function of the at least one electrical characteristic determined.

17. A method of controlling an oscillating electric motor of a small electric appliance, the method comprising:
supplying an electric current to a coil to produce a magnetic field emanating from a first motor component and setting a second motor component in an oscillatory motion relative to the first motor component;
determining at least one electrical characteristic of the coil for an instant of time at which current is supplied to the coil, the instant of time corresponding to a maximum relative velocity between the two motor components, and the at least one electrical characteristic being related to a motion quantity of the first motor component relative to the second motor component; and then
supplying further current to the coil as a function of the at least one electrical characteristic determined,
wherein the instant of time corresponding to the maximum relative velocity is determined as a function of at least two instants of time at which the relative velocity equals zero, and wherein the instants of time at which the relative velocity equals zero are determined as instants of time at which a calculated quantity of voltage across the coil minus a product of motor resistance and motor current minus a product of motor inductance and variation of the motor current over time.

18. A method of controlling an oscillating electric motor of a small electric appliance, the method comprising:
supplying an electric current to a coil to produce a magnetic field emanating from a first motor component and setting a second motor component in an oscillatory motion relative to the first motor component,
wherein an oscillation frequency of the motor components is determined as a function of at least two instants of time at which a relative velocity between the two motor components equals zero;
determining at least one electrical characteristic of the coil for an instant of time at which current is supplied to the coil,
the at least one electrical characteristic being related to a motion quantity of the first motor component relative to the second motor component; and then
supplying further current to the coil as a function of the at least one electrical characteristic determined,
wherein the instants of time at which the relative velocity equals zero correspond to instants of time at which the voltage across the coil equals zero, and wherein the instants of time at which the voltage across the coil equals zero are determined by repeatedly sensing an operational sign of the voltage across the coil and detecting a change of the operational sign between successive detections, and wherein determining the instants of time at which the voltage across the coil equals zero further comprises interpolating between a last detection preceding the sign change and a first detection following the sign change.

19. A method of controlling an oscillating electric motor of a small electric appliance, the method comprising:

supplying an electric current to a coil to produce a magnetic field emanating from a first motor component and setting a second motor component in an oscillatory motion relative to the first motor component;

determining at least one electrical characteristic of the coil for an instant of time at which current is supplied to the coil;

based on the determined electrical characteristic, determining a motion quantity of the first motor component relative to the second motor component; and then supplying further current to the coil as a function of the at least one electrical characteristic determined, wherein an oscillation frequency of the motor components is determined as a function of at least two instants of time at which a relative velocity between the two motor components equals zero, and wherein the instants of time at which the relative velocity equals zero correspond to instants of time at which the voltage across the coil equals zero, and wherein the instants of time at which the voltage across the coil equals zero is determined by repeatedly sensing an operational sign of the voltage across the coil and detecting a change of the operational sign between successive detections and interpolating between a last detection preceding the sign change and a first detection following the sign change.

20. A method of controlling an oscillating electric motor of a small electric appliance, the method comprising:

supplying an electric current to a coil to produce a magnetic field emanating from a first motor component and setting a second motor component in an oscillatory motion relative to the first motor component;

determining at least one electrical characteristic of the coil for an instant of time at which current is supplied to the coil;

based on the determined electrical characteristic, determining a motion quantity of the first motor component relative to the second motor component; and then supplying further current to the coil as a function of the at least one electrical characteristic determined, wherein the at least one electrical characteristic is determined at an instant of time corresponding to a maximum relative velocity between the two motor components, and wherein the instant of time corresponding to the maximum relative velocity is determined as a function of at least two instants of time at which the relative velocity equals zero, and wherein the instants of time at which the relative velocity equals zero are determined as instants of time at which a calculated quantity of voltage across the coil minus a product of motor resistance and motor current minus a product of motor inductance and variation of the motor current over time.

21. A method of controlling an oscillating electric motor of a small electric appliance, the method comprising:

supplying an electric current to a coil to produce a magnetic field emanating from a first motor component and setting a second motor component in an oscillatory motion relative to the first motor component;

determining a variation of current flowing through the coil over time by detecting measured values at current prior to and subsequent to an instant of time at which current is supplied to the coil, and dividing a difference of the measured values by a time difference between current detections;

based on the variation of current flowing through the coil, determining a motion quantity of the first motor component relative to the second motor component; and then supplying further current to the coil as a function of the variation of current flowing through the coil.

22. The method of claim 21, wherein the variation of current flowing through the coil over time is determined as a function of an instant of time corresponding to a maximum relative velocity between the two motor components.

23. The method of claim 22, wherein the instant of time corresponding to the maximum relative velocity is determined as a function of at least two instants of time at which the relative velocity equals zero.

24. The method of claim 22, wherein the instant of time corresponding to the maximum value of the relative velocity is determined as a midpoint between adjacent instants of time at which a voltage across the coil equals zero.

25. The method of claim 21, wherein an oscillation frequency of the motor components is determined as a function of at least two instants of time at which a relative velocity between the two motor components equals zero.

26. The method of claim 25, wherein the instants of time at which the relative velocity equals zero correspond to instants of time at which the voltage across the coil equals zero.

27. The method of claim 26, wherein the instants of time at which the voltage across the coil equals zero is determined by repeatedly sensing an operational sign of the voltage across the coil and detecting a change of the operational sign between successive detections.

28. The method of claim 21, wherein a parameter for characterizing the oscillatory motion of the electric motor is determined from the variation of current flowing through the coil over time.

29. The method of claim 28, wherein a velocity of the second motor component is determined as a function of the variation of current flowing through the coil over time.

30. The method of claim 28, wherein an oscillation amplitude of the second motor component is determined as a function of the variation of current flowing through the coil over time.

31. The method of claim 28, wherein the current supplied to the coil is varied as a function of a difference between a target value and the determined parameter for characterizing the oscillatory motion.

32. The method of claim 21, wherein the current is supplied to the coil as a pulse-width-modulated voltage, and the pulse width is determined as a function of the variation of current flowing through the coil over time.

33. The method of claim 21, wherein a strength of the current supplied to the coil is a function of the variation of current flowing through the coil over time.

* * * * *